United States Patent

Gallego et al.

Patent Number: 6,048,621
Date of Patent: Apr. 11, 2000

[54] COATED GLASS

[75] Inventors: Jose Manuel Gallego, Ormskirk; John Robert Siddle, Southport, both of United Kingdom

[73] Assignee: Pilkington PLC, St. Helens, United Kingdom

[21] Appl. No.: 08/926,714

[22] Filed: Sep. 10, 1997

Related U.S. Application Data

[60] Provisional application No. 60/026,079, Sep. 13, 1996.

[51] Int. Cl.[7] ................ E06B 3/66; B32B 15/00
[52] U.S. Cl. ........... 428/432; 428/34; 428/472; 428/701; 428/702; 52/786.1
[58] Field of Search ............ 428/34, 432, 702, 428/434, 469, 472, 701, 913; 52/786.1

[56] References Cited

U.S. PATENT DOCUMENTS

| | | |
|---|---|---|
| 4,017,661 | 4/1977 | Gillery ............ 428/412 |
| 4,187,336 | 2/1980 | Gordon . |
| 4,308,115 | 12/1981 | Foster, Jr. et al. . |
| 4,368,945 | 1/1983 | Fujimori et al. . |
| 4,583,815 | 4/1986 | Taga et al. . |
| 4,595,634 | 6/1986 | Gordon . |
| 4,828,880 | 5/1989 | Jenkins et al. . |
| 5,004,490 | 4/1991 | Brown . |
| 5,034,246 | 7/1991 | Mance et al. . |
| 5,168,003 | 12/1992 | Proscia . |

FOREIGN PATENT DOCUMENTS

| | | |
|---|---|---|
| 1117383 | 2/1982 | Canada . |
| 0 275 662 | of 0000 | European Pat. Off. . |
| 0 523 877 A1 | 1/1993 | European Pat. Off. . |
| 0 365 239 B1 | 4/1993 | European Pat. Off. . |
| 0 546 669 B1 | 4/1996 | European Pat. Off. . |
| 0 735 009 A1 | 10/1996 | European Pat. Off. . |
| 2 031 756 | of 0000 | United Kingdom . |
| 2 115 315 | of 0000 | United Kingdom . |
| 2 026 454 | 7/1982 | United Kingdom . |
| 2 288 818 | 11/1995 | United Kingdom . |

OTHER PUBLICATIONS

International Search Report issued by the European Patent Office on Dec. 11, 1997, in the corresponding PCT application.

*Primary Examiner*—Donald Loney
*Attorney, Agent, or Firm*—Marshall & Melhorn

[57] ABSTRACT

A high performance solar control glass comprises a glass substrate with a coating comprising a heat absorbing layer and a low emissivity layer of a metal oxide. Preferred heat absorbing layers absorb preferentially at wavelengths above 700 nm, and may be, for example, of non-stoichiometric or doped tungsten oxide, or of cobalt oxide, chromium oxide, iron oxide or vanadium oxide. Preferred low emissivity layers are of semi-conductor metal oxide, for example doped tin oxide or doped indium oxide. Because of the nature of the layers, the coatings may be of neutral color and be suitable for deposition on-line on the glass ribbon, during the glass production process, by pyrolytic methods for example chemical vapor deposition.

20 Claims, 1 Drawing Sheet

COATED GLASS

BACKGROUND OF THE INVENTION

This application is claiming the benefit, under U.S.C.§ 119(e), of the provisional application filed Sep. 13, 1996, under 35 U.S.C.§ 111(b), which was granted a Ser. No. 60/026,079. The provisional application, 60/026,079, is hereby incorporated by reference.

The invention relates to coated glass, and in particular to high performance solar control coated glass.

There is an increasing demand for solar control glasses, especially high performance solar control glasses that exhibit a neutral color in both reflection and transmission. "High performance" solar control glasses means glasses which transmit a significantly higher percentage of incident light than of total incident radiation energy (total solar heat). Body tinted glasses containing added iron are capable of providing high solar control performance, but the iron tends to tint the glass green, and a green tint is not always acceptable. Inclusion of further additives, for example, a combination of selenium and a metal oxide such as cobalt oxide, can convert the green tint to a more neutral color, but at the cost of some loss of performance i.e. with an increase in the proportion of incident heat: incident light transmitted. Coatings incorporating silver layers in combination with appropriate dielectric layers in multilayer stacks can provide high performance solar control products, close to neutral in both reflection and transmission, but have significant disadvantages. First, suitable silver layers are not susceptible to on-line deposition methods in which the coating is applied to the hot glass ribbon as it is produced i.e. before it is cut and removed from the production line, but are applied by the off-line low pressure techniques such as magnetron sputtering. Second, such coatings have limited physical durability requiring careful protection and handling during processing, and protection of the coated glass in the final product, for example, by glazing a multiple glazing unit with the coating facing the airspace of the unit.

It would be desirable to have a coating which would provide a high performance solar control glazing without the disadvantages of the silver coatings referred to above, and which preferably would have a near neutral color in reflection and transmission, or at least provide an alternative to the green reflection and transmission colors characteristic of the high performance body tinted glasses referred to above.

According to the present invention there is provided a high performance solar control coated glass comprising a glass substrate and a coating comprising a heat absorbing layer and a low emissivity layer comprising a metal compound.

BRIEF DESCRIPTION OF THE DRAWINGS

The invention is illustrated but not limited by the accompanying diagrammatic drawings in which.

DESCRIPTION OF THE PREFERRED EMBODIMENT

Figure 1:
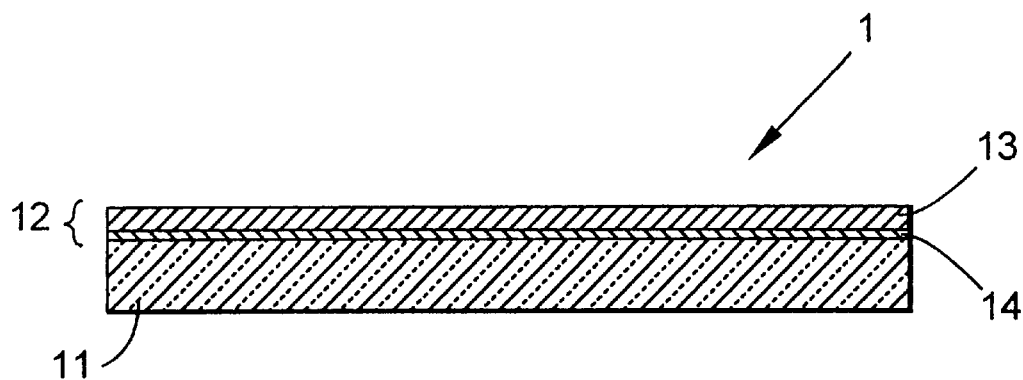
FIG. 1 shows a section through a coated glass in accordance with one embodiment of the invention.

Referring to FIG. 1, a high performance solar control coated glass 1 comprises a glass substrate 11, preferably of clear float glass, and a coating 12 comprising a heat absorbing layer 14 and a low emissivity layer 13 of a metal compound.

Figure 2:
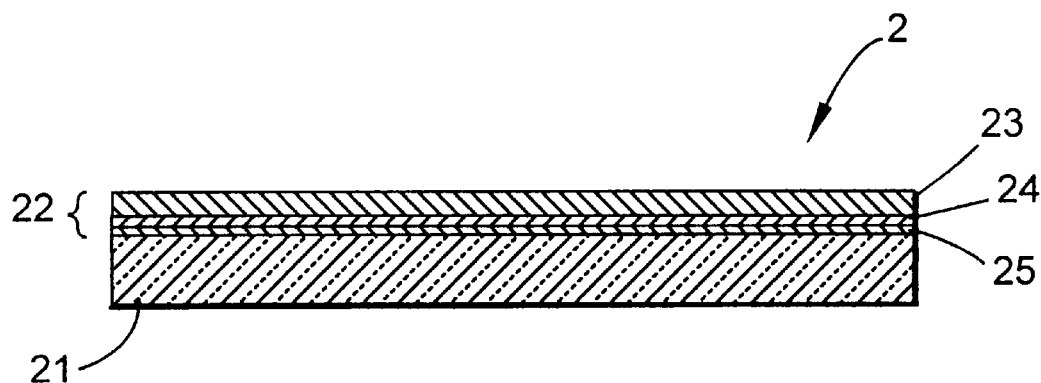
FIG. 2 shows a section through a coated glass in accordance with a second preferred embodiment of the invention.

The embodiment shown in FIG. 2 is similar to the embodiment of FIG. 1, with a coated glass 2 comprising a glass substrate 21, preferably of clear float glass, and a coating 22. However, coating 22 differs from coating 12 in that it comprises, in addition to heat absorbing layer 24 and low emissivity layer 23, an iridescence suppressing underlayer 25 as further discussed hereinafter.

Figure 3:
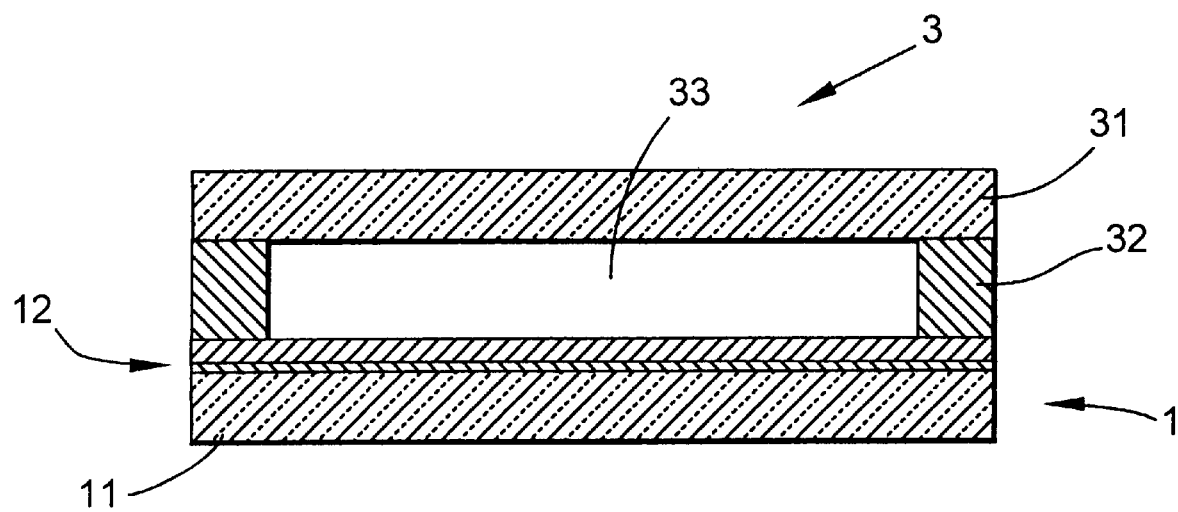
FIG. 3 shows a section through a double glazing unit incorporating a coated glass as illustrated in FIG. 1.

FIG. 3 illustrates the coated glass pane 1 of FIG. 1 assembled in parallel spaced relationship with a second pane of glazing material 31, typically of clear float glass, the panes being spaced apart and sealed together by spacing and sealing system 32, to form double glazing unit 3 having airspace 33. The coating 12 faces the airspace 33 of the unit.

To enhance the performance, it is desirable that the heat absorbing layer of the coating absorbs preferentially at wavelengths above 700 nm; preferably, it is substantially non-absorbing in the visible region of the spectrum. The heat absorbing layer may be a substantially transparent conductive oxide layer, with tungsten oxide being preferred in view of the characteristic absorption peak it exhibits around 900 nm.

Tungsten oxide exists in both conductive and dielectric forms. Stoichiometric tungsten oxide, $WO_3$, is a dielectric, being substantially non-absorbing in the near infra red. Non-stoichiometric tungsten oxide, $WO_{3-x}$, where x is typically up to about 0.03 (preferably in tile range 0.005 to 0.025), and doped tungsten oxide, containing an appropriate dopant of different valency, for example, hydrogen, fluorine, an alkali metal, copper, silver or gold are conductive and suitable for use in the practice of the present invention.

A tungsten oxide layer used as a heat absorbing layer may be crystalline or amorphous. If crystalline, it is generally preferred to avoid too large a crystal size as large crystals are liable to result in the appearance of haze.

Other heat absorbing materials which may be used to form the heat absorbing layer include other colored transition metal oxides such as chromium oxide, cobalt oxide, iron oxide, molybdenum oxide, niobium oxide and vanadium oxide; mixtures of such metal oxides may also be used.

The heat absorbing layer will normally have a thickness in the rage 50 nm to 500 nm, especially 80 nm to 200 nm.

The low emissivity layer is a layer of a metal compound, normally a metal oxide (as other low emissivity compounds such as metal nitrides and metal silicides tend to have lower light transmissions), and a transparent semiconductor, for example, a doped indium, tin or zinc oxide. Preferred materials include tin doped indium oxide and fluorine doped tin oxide. The low emissivity layer will normally have a thickness in the range 100 nm to 600 nm (as use of a thicker layer is likely to result in an unnecessary reduction in light transmission without sufficient reduction in emissivity to compensate), especially a thickness in the range 200 nm to 500 nm. The low emissivity layer may have an emissivity of less than 0.4 (the numerical values of emissivity referred to in this description and the accompanying claims are values of normal emissivity, measured in accordance with ISO 10292: 1994, Annex A), although it is preferred to use a low emissivity layer which provides an emissivity of 0.2 or less.

The low emissivity layer of the coating will normally overlie the heat absorbing layer, with the solar control glass glazed with the coating facing towards the interior of the glazed space (usually, but not necessarily, a building).

Use of thin films, as in the present invention, may result in the appearance of interference colors and iridescence. To avoid or at least alleviate undesirable color resulting from interference effects, a color suppressing underlayer (which may itself be a combination of sub-layers) may be applied to the glass prior to deposition of the heat absorbing and low emissivity layers. The composition and deposition of such iridescence suppressing underlayers is described in prior published patents including GB 2 031 756B, UK 2 115 315B and EPO 275 662B. Thus, according to a preferred aspect of the invention, an iridescence suppressing layer or layers is incorporated under the coating comprising a heat absorbing layer and a low emissivity layer.

An additional layer may be incorporated over the coating, for example as an anti-reflection layer, but the use of such overlayers may lead to a loss of the low emissivity properties i.e. an increase in emissivity, and is not usually preferred.

The heat absorbing layer and low emissivity layer of the present invention may be deposited by known techniques, for example, by sputtering, including reactive sputtering, or by chemical vapor deposition. Indeed, it is an important advantage of the invention that both the above layers are susceptible to deposition by chemical vapor deposition techniques providing for the possibility of applying the coating to the hot ribbon of glass during the glass production process. Methods of depositing heat absorbing layers by chemical vapor deposition are described, for example, in EP 0 523 877 A1 and EP 0 546 669 B1, while methods of depositing metal oxide low emissivity layers by chemical vapor deposition are described, for example, in GB 2 026 454B and EP 0 365 239B.

The invention is illustrated but not limited by the following Examples. In the Examples, as in the remainder of the description and claims, the visible light transmissions stated are measured using Illuminant C. The total solar heat transmissions stated are determined by weighting with a solar spectral irradiance function (ASTM E87-891) which represents the direct normal radiation incident on a surface at 37° northern latitude (air mass 1.5).

EXAMPLE 1

An iridescence suppressing underlayer, comprising silicon, carbon and oxygen, having a thickness of 65 nm and a refractive index of about 1.7 was applied to a ribbon of 3 mm clear float glass as described in EP 0 275 662B.

A glass pane cut from the ribbon was overcoated by conventional reactive magnetron dc sputtering over the underlayer with a heat absorbing tungsten oxide layer about 100 nm thick doped with hydrogen to provide an absorption peak of 70% at a wavelength of 910 nm (when measured on clear 3 mm float glass in the absence of an underlayer).

An indium tin oxide layer about 165 nm thick, serving as a low emissivity layer and exhibiting an electrical resistivity of $4 \times 10^{-4}$ ohms centimeters, was deposited over the tungsten oxide layer by conventional reactive magnetron dc sputtering using an indium tin target containing 10 atomic percent tin. Such an indium tin oxide layer has an emissivity of about 0.08.

The resulting coated glass pane had the following properties:

| Visible light transmission | 70.4% |
|---|---|
| Total solar heat transmission | 55.9% |

On incorporation of the coated pane into a double glazing unit with a 3 mm pane of uncoated clear float glass and an air space of 12 mm, and with the coating towards the air space, the resulting unit would have a visible light transmission of 64% and a total solar heat transmission of 44%, and exhibit the following reflection and transmission colors under illumination (Illuminant C):

|  | a* | b* | L* |
|---|---|---|---|
| Reflection | −5.2 | −5.1 | 46 |
| Transmission | −2.9 | 1.2 | 84 |

EXAMPLE 2

An iridescence suppressing underlayer system, comprising an initial layer of undoped tin oxide 25 nm thick and a layer of silica 25 nm thick was applied to a ribbon of clear float glass 3 mm thick.

A glass pane cut from the ribbon was overcoated by conventional reactive magnetron dc sputtering over the underlayer with a heat absorbing tungsten oxide layer doped with lithium about 420 nm (when measured on clear 3 mm float glass in the absence of an underlayer).

An indium tin oxide layer about 85 nm thick, serving as a low emissivity layer and exhibiting an electrical resistivity of $4 \times 10^{-4}$ ohms centimeters was deposited over the tungsten oxide layer by conventional reactive magnetron dc sputtering using an indium tin target containing 10 atomic percent tin.

The resulting coated glass pane had the following properties:

| Visible light transmission | 69% |
|---|---|
| Total solar heat transmission | 54% |

On incorporation of the coated pane in to a double glazing unit with a 3 mm pane of uncoated clear float glass and an air space of 12 mm, and with the coating toward the air space, the resulting unit would have a visible light transmission of 63% and a total solar heat transmission of 41% and exhibit the following reflection and transmission colors under illumination (Illuminant C):

|  | a* | b* | L* |
|---|---|---|---|
| Reflection | −3.6 | −3.3 | 90 |
| Transmission | −9.3 | 5.1 | 84 |

EXAMPLE 3

An iridescence suppressing underlayer as described in Example 2 was applied to a ribbon of float glass 3 mm thick.

A glass pane cut from the ribbon was overcoated with a heat absorbing non-stoichiometric tungsten oxide layer about 104 nm thick by magnetron dc sputtering from an oxide target. The oxidation state of the tungsten in the tungsten oxide was determined to correspond to a tungsten oxide of formula $WO_{2.98}$.

An indium tin oxide layer about 270 nm thick, serving as a low emissivity layer, was deposited over the tungsten oxide layer by conventional reactive magnetron dc sputtering using an indium tin target containing 10 atomic percent tin.

On incorporation of the coated pane in a double glazing unit with a 3 mm pane of uncoated clear float glass and an air space of 12.5 mm and with the coating towards the air space, the resulting unit would have a visible light transmission of 66% and a total solar heat transmission of 46% and exhibit the following reflection and transmission colors under illumination (Illuminant C):

|  | a* | b* | L* |
|---|---|---|---|
| Reflection | −7.7 | −2.25 | 49 |
| Transmission | −1.9 | 0.61 | 85 |

EXAMPLES 4–9

In each of this series of Examples, the optical properties of coated 3 mm clear float glass, and of a double glazing unit comprising a pane of the coated glass and a pane of 3 mm uncoated clear float glass with an air space of 12.5 mm and the coating towards the air space were computed from the known optical properties of the glass and coating layers. The structure of the coatings and properties of the coated glasses are set out in accompanying Tables 1 and 2.

TABLE 1

| Example | 4 | 5 | 6 |
|---|---|---|---|
| First coating layer | 380 nm tungsten oxide[1] | 240 nm tungsten oxide | 126 nm tungsten oxide |
| Second coating layer | 320 nm fluorine doped tin oxide[2] | 260 nm ITO[3] | 300 nm ITO[3] |
| Visible LT of coated pane | 74.4% | 70.1% | 60.1% |
| Total SHT of coated pane | 53.5% | 51.2% | 49.3% |
| Emissivity of coated pane | 0.12–0.2 | 0.08 | 0.07 |
| Visible LT of double glazing unit | 66.6% | 63.6% | 55.0% |
| Total SHT of double glazing unit | 41.8% | 41.2% | 41.0% |
| Reflection color of double glazing unit | a* −8.3, b* 5.9, L 44 | a* 0.5, b* 1.4, L 53 | a* −2.3, b* 3.2, L 56 |
| Transmission of double glazing unit | a* −6.3, b* 7.9, L 86 | a* −6.8, b* 8.2, L 83 | a* −6.4, b* 7.6, L 72 |

[1]properties of dc magnetron sputtered non-stoichiometric tungsten oxide used in computation
[2]properties of fluorine doped tin oxide coating deposited by chemical vapor deposition in computation
[3]properties of dc magnetron sputtered tin doped indium oxide coating with electrical resistivity of $1.8 \times 10^4$ Ω cm used in computation
[4]properties of dc magnetron sputtered niobium pentoxide dopes with 30% atom of lithium used in computation

TABLE 2

| Example | 7 | 8 | 9 |
|---|---|---|---|
| First coating layer | 96 nm tungsten oxide[3] | 380 nm niobium pentoxide[4] | 240 nm niobium pentoxide[4] |
| Second coating layer | 300 nm ITO[3] | 320 nm fluorine doped tin oxide[2] | 260 nm ITO[3] |
| Visible LT of coated pane | 56.3% | 71.3% | 68.2% |
| Total SHT of coated pane | 45.6% | 54.6% | 53.1% |

TABLE 2-continued

| Example | 7 | 8 | 9 |
|---|---|---|---|
| Emissivity of coated pane | 0.07 | 0.12–0.2 | 0.08 |
| Visible LT of double glazing unit | 51.3% | 64.1% | 61.0% |
| Total SHT of double glazing unit | 35.2% | 42.7% | 42.5% |
| Reflection color of double glazing unit | a* −4.3, b* 2.1, L 59 | a* −8.0, b* 6.1, L 43 | a* 0.6, b* 1.1, L 54 |
| Transmission of double glazing unit | a* −5.3, b* 6.1, L 68 | a* −6.4, b* 7.3, L 87 | a* −7.2, b* 7.9, L 85 |

[1]properties of dc magnetron sputtered non-stoichiometric tungsten oxide used in computation
[2]properties of fluorine doped tin oxide coating deposited by chemical vapor deposition in computation
[3]properties of dc magnetron sputtered tin doped indium oxide coating with electrical resistivity of $1.8 \times 10^4$ Ω cm used in computation
[4]properties of dc magnetron sputtered niobium pentoxide dopes with 30% atom of lithium used in computation The coatings of the present invention offer important advantages over the prior art. Being suitable for a production by pyrolytic methods (which have the added benefit of lending themselves to application on-line) they can be obtained in highly durable form, reducing the need for special care in handling and processing and opening up the possibility of using the coatings in free standing glazing without the need to protect them within multiple glazing units. In comparison with body tinted glasses, they offer the advantages of being suitable for production by a more flexible technique (coating) applicable without the need to change the composition in the glass melting tank (with the inherent loss of production as the changeover takes place), and avoiding the strong green tints observed with the higher performing body tints.

Moreover, excellent performances may be achieved, with glasses having a visible light transmission of over 67% providing total solar heat transmission of less than 57%. In general, the solar control glazings of the present invention will provide a total solar heat transmission at least 10% less than the visible light transmission, while glazings providing a total solar heat transmission at least 12% below (at least 15% below when the coated glass is used with a pane of clear float glass in a double glazing unit) are readily achievable and preferred.

The preferred coated glasses of the present invention are glasses wherein the coating is such as to exhibit reflection (when viewed from the coated side) and transmission (when applied to clear float glass) colors such that $(a^{*2}+b^{*2})^{1/2}$ is less than 12, especially less than 10. In especially preferred embodiments, the reflection and transmission colors are each such that $(a^{*2}+b^{*2})^{1/2}$ is less than 7.

What is claimed is:

1. A high performance solar control coated glass comprising a glass substrate with a coating comprising a heat absorbing layer and a low emissivity layer of a metal compound, wherein the low emissivity layer of the coating overlies the heat absorbing layer, and wherein the low emissivity layer has a thickness in the range 100 nm to 600 nm and wherein the coated glass has an emissivity of less than 0.4.

2. A coated glass according to claim 1, wherein the heat absorbing layer of the coating absorbs preferentially at wavelengths above 700 nm.

3. A coated glass according to claim 1, wherein the heat absorbing layer of the coating is a metal oxide layer.

4. A coated glass according to claim 1, wherein the heat absorbing layer of the coating is a tungsten oxide layer containing less than the stoichiometric amount of oxygen.

5. A coated glass according to claim 1, wherein the heat absorbing layer of the coating is of tungsten oxide doped with a hydrogen.

6. A coated glass according to claim 1, wherein the heat absorbing layer of the coating is of tungsten oxide doped with an alkali metal.

7. A coated glass according to claim 3, wherein the heat absorbing layer of the coating is selected from the group consisting of chromium oxide, cobalt oxide, iron oxide, molybdenum oxide, niobium oxide and vanadium oxide or a mixture thereof.

8. A coated glass according to claim 1, wherein the heat absorbing layer of the coating has a thickness in the range of 50 nm to 500 nm.

9. A coated glass according to claim 1, wherein the heat absorbing layer of the coating has a thickness in the range of 80 nm to 200 nm.

10. A coated glass according to claim 1, having an emissivity of less than 0.2.

11. A coated glass according to claim 1, in which the low emissivity layer is of semiconductor metal oxide.

12. A coated glass according to claim 11, wherein the semiconductor metal oxide is doped tin oxide or doped indium oxide.

13. A coated glass according to claim 11, wherein the low emissivity layer has a thickness in the range 200 nm to 500 nm.

14. A coated glass according to claim 1, wherein the coating additionally comprises an iridescence suppressing layer or layers under the heat absorbing layer.

15. A coated glass according to claim 1, exhibiting a total solar heat transmission at least 10% less than its visible light transmission.

16. A coated glass according to claim 15, exhibiting a visible light-transmission of over 67% and a total solar heat transmission of less than 57%.

17. A coated glass according to claim 1, wherein the coating is such as to exhibit reflection, when viewed from the coated side, or transmission, when applied to clear float glass, colors which are each such that $(a^{*2}+b^{*2})^{1/2}$ is less than 12.

18. A coated glass according to claim 17, wherein the coating is such as to exhibit reflection, when viewed from the coated side, or transmission, when applied to clear float glass, colors such that $(a^{*2}+b^{*2})^{1/2}$ is less than 7.

19. A multiple glazing unit comprising a pane of coated glass, having a heat absorbing layer and a low emissivity layer of a metal compound, in a spaced parallel relationship with a second glazing pane, wherein the low emissivity layer of the coating overlies the heat absorbing layer and the low emissivity layer has a thickness in the range of 100 nm to 600 nm and the coated glass has an emissivity of less than 0.4.

20. A multiple glazing unit as claimed in claim 19, exhibiting a total solar heat transmission at least 15% less than its visible light transmission.

* * * * *